Oct. 7, 1969  E. J. DOWER  3,470,971
APPARATUS AND METHOD FOR AUTOMATICALLY CONTROLLING
FLUID PRESSURE IN A WELL BORE
Filed April 28, 1967  2 Sheets-Sheet 1

Ethell J. Dower
INVENTOR

BY Lee R. Larkin

ATTORNEY

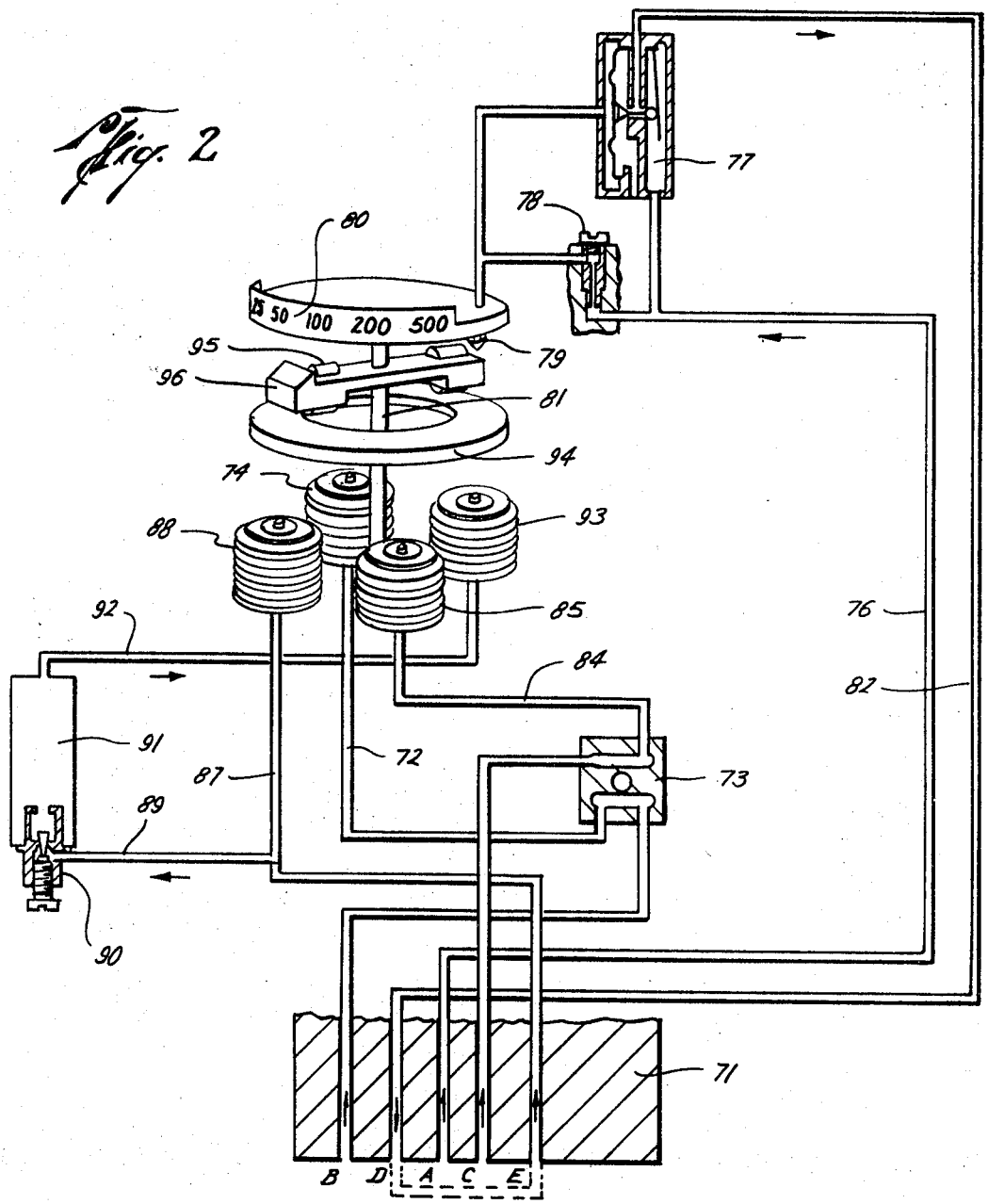

United States Patent Office 3,470,971
Patented Oct. 7, 1969

3,470,971
APPARATUS AND METHOD FOR AUTOMATI-
CALLY CONTROLLING FLUID PRESSURE
IN A WELL BORE
Ethell J. Dower, Houston, Tex., assignor to Warren
Automatic Tool Company, Houston, Tex., a corporation of Texas
Filed Apr. 28, 1967, Ser. No. 634,534
Int. Cl. E21b 21/00, 3/12; F15d 1/02
U.S. Cl. 175—25                                   13 Claims

ABSTRACT OF THE DISCLOSURE

Apparatus and method for automatically controlling bottom-hole pressure in a well bore having a drill string and drilling fluid therein. The apparatus includes a signal actuated casing pressure regulator means connected at the fluid return line and means for automatically controlling the regulator means to impose back pressure of a required magnitude on the return fluid, substantially independently of the return fluid's flow characteristics. The method includes sensing input fluid pressure (i.e. drill pipe pressure) generating a signal which reflects variations in input fluid pressure and controlling return fluid pressure with the generated signal and independently of output fluid flow characteristics.

---

This invention relates to an apparatus and method for automatically controlling fluid pressure in a well bore having a drill string and drilling fluid therein. It includes means for utilizing drill pipe pressure on a well being drilled to automatically control casing pressure independently of fluid flow characteristics during circulation to control "kicks" in order to prevent blow-out conditions from arising.

In the past, it has been common practice to utilize a pressure regulator means on the mud return line, and to operate the regulator means to maintain a preset or predetermined back pressure on the mud flow from the casing to thereby prevent a possible blow-out, until mud of higher specific gravity can be pumped into the well to compensate for the increased formation pressure. This back pressure is applied during a "kick," which pressure plus fluid hydrostatic pressure is sufficient to counter-balance bottom hole formation pressure, thus stopping the incursion of formation fluids into the drilling fluid. Those skilled in the art understand the well-known and published principle of "constant drill pipe pressure in circulating out a kick and in killing the well." The principle is based upon the fact that, assuming constant mud properties, correct casing pressure, which changes during the operation, creates constant bottom hole pressure and therefore results in a constant drill pipe pressure when circulating rate is held constant.

An object of this invention is to automatically maintain a substantially "constant bottom hole pressure" while circulating out a "kick."

The term "constant bottom hole pressure" is used to mean a drilling fluid pressure at the bottom of the bore hole which is substantially equal to or slightly more than bottom hole formation pressure.

In the past, when performing the foregoing circulation operation without the benefit of applicant's invention, there was a tendency for the back pressure applied to the return drilling mud to be either too little or too great at certain times, such that the bottom hole well pressure was not in all instances held relatively constant or within the desired ranges, and loss of circulation or further incursion occurred in some instances.

Briefly stated, the apparatus of this invention contemplates means for holding output fluid (return) pressure at a value which is substantially independent of output fluid flow characteristics (such as gas slugs and debris) and is controlled by a signal which is derived from variations in input fluid pressure. The method contemplates controlling output fluid (return) pressure regulating means independently of output fluid flow characteristics, with a transmitted signal which reflects variations in input fluid pressure.

More specifically, one embodiment of the invention herein includes first conduit means connected to said well for receiving therethrough drilling fluid returning from said well. It also includes a valve means connected in said first conduit means for controlling the drilling fluid flow therethrough.

A first transmitter means (conveniently in the form of a pneumatic pressure transmitter) is connected to be responsive to the pressure of the drilling fluid just prior to circulation of the fluid down the well and to provide an output which is representative of the pressure of said fluid prior to said circulation (drill pipe pressure). It also includes a second transmitter means (conveniently in the form of a pneumatic pressure transmitter) connected to be responsive to the pressure of the returning fluid upstream from said valve means and having an output which is representative of the pressure of said returning fluid (casing pressure).

There may also be included a relay means (conveniently in the form of a pneumatic biasing relay), connected to receive the output of said second transmitter means and having an output which is representative of the pressure of said return drilling fluid plus a predetermined additional pressure. For purposes of convenience, this relay may sometimes be described as being included in the term "limiting means."

The invention also includes set point means (conveniently a pneumatic pressure regulator) having an adjustable set point output, and controller means (conveniently a pneumatic controller) connected to be responsive to the outputs of said first and second transmitter means, said relay means and set point means. The controller provides an output the change of which is proportional to the difference between the outputs from said set point means and first transmitter means (drill pipe pressure, which is the measured variable). It also includes a means for using the output of said controller means to operate said valve means to thereby maintain a correct back pressure on said returning fluid independently of the return fluid's flow characteristics. For purposes of convenience this controller may sometimes be described as being included in "first control means."

Reference to the drawings, which illustrate a preferred embodiment, will further explain the invention wherein like numerals refer to like parts and in which:

FIG. 2 is a diagrammatic illustration, partially in exploded isometric view, showing one embodiment of the first control means.

Figure 1:
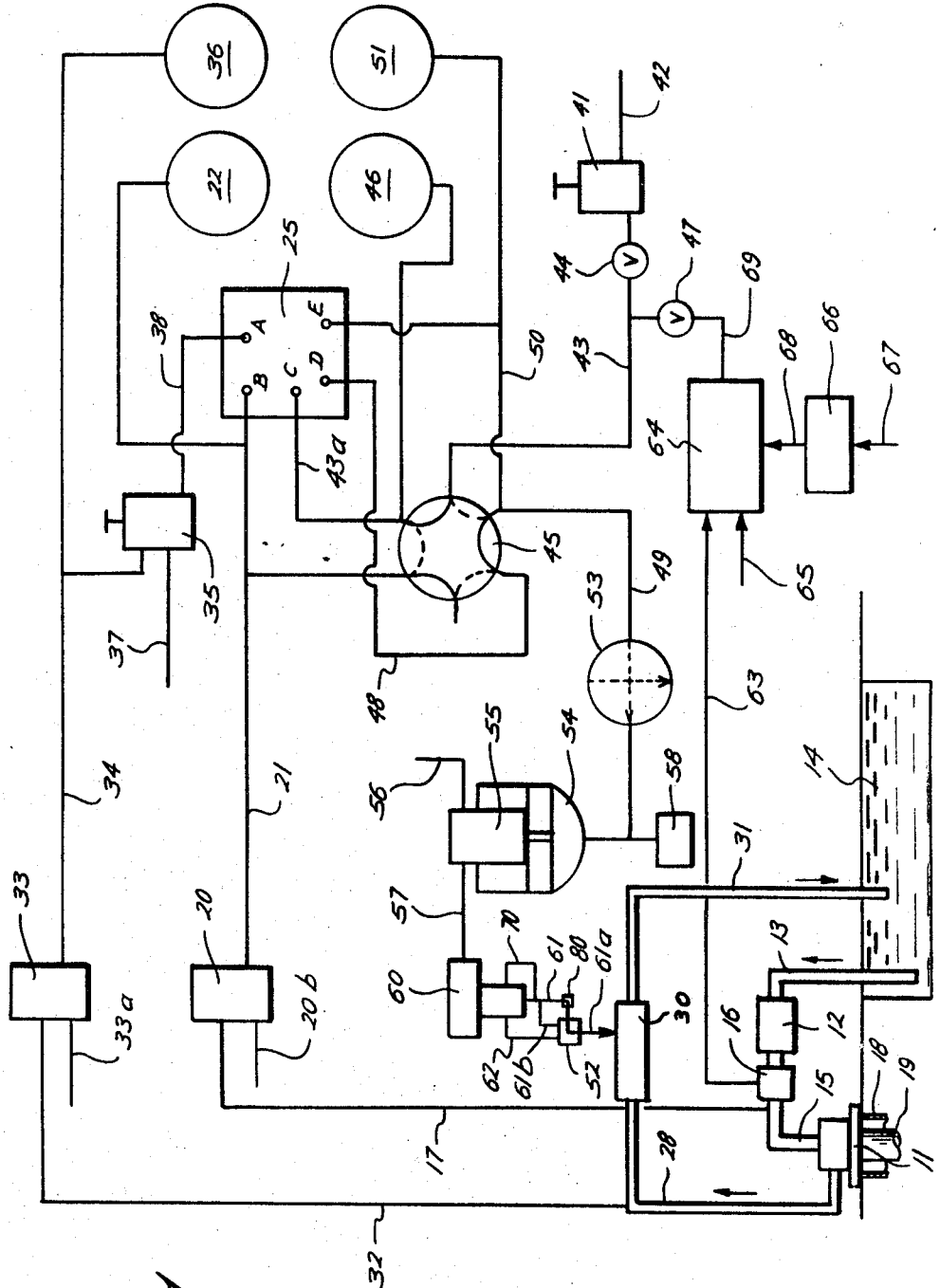
FIG. 1 is a diagrammatic illustration, partially in side elevation, showing installation on a drilling well.

Referring now to FIG. 1, the well being drilled is indicated as having casing 18 with drill string 19 therein, and a rotary table and blow-out preventors indicated by the numeral 11, which are of standard construction, with rig pump 12 adapted to take suction through pipe 13 from mud tank 14 and deliver it to pipe 15 which is connected to the drill pipe for passage of the drilling fluid downwardly through drill string 19. Pipe 15 has mounted therein a target type flow meter 16, the purpose of which will be explained hereinafter. Pipe 15 also has connected thereto line 17 which is adapted to transmit the drill pipe pressure (input drilling fluid pressure) to a first pressure transmitter having a pneumatic pressure output which is representative of the pressure of the drilling fluid prior to circulation down through the well in the form of force balance pneumatic pressure transmitter 20. Pressure transmitter 20 is of the type manufactured by the Foxboro Company of Foxboro, Massachusetts, and designated as its Model 11GH and shown in its book #1783, dated June 1964, at page designated as 4–320, page 1. The transmitter is of a type that measures hydraulic pressure and transmits it as a proportional 3–15 p.s.i. pneumatic signal. The output of pressure transmitter 20 (measured variable) is applied to line 21 which is connected to drill pipe pressure dial gauge 22 for convenient visual readout and to the measured signal input B of controller 25.

Controller 25 may sometimes be referred to as the controller means which is adapted for providing a pneumatic controller pressure output the change of which is proportional to the difference between the set point pressure and the measured variable pressure (drill pipe pressure), as will be described hereinafter. One such controller which may be utilized in applicant's invention is sold by the Foxboro Company, Foxboro, Mass. and designated as its Model 58 Consotrol Controller and described in its book #1743 at pages designated 17–170, page 1, and 17–170, page 2.

The well is also shown having mud return line 28 for receiving the return fluid from the annulus between casing 18 and drill string 19 and directing it through valve 30 which imposes back pressure on the return fluid.

Valve 30 may take many different forms and no claim is made herein to the specific type of valve which may be used. However, it must be arranged to control returning fluid pressure substantially independently of variations in the flow characteristics of the returning or output fluid. Thus, if the valve is in the form of a mechanical valve, it must be connected to be responsive to the pressure of the return fluid.

One example of a valve which can be used is the automatic choke described in the magazine entitled The Oil and Gas Journal, Oct. 18, 1965, pages 7, 52, and 53. Another valve which may be used is described in the same magazine dated Aug. 9, 1965, at pages 8, 94, and 95. The preferred valve is one having a rubber sleeve enclosed within a tubular housing, and having means for applying the fluid pressure to a surface thereof, thereby compressing and deforming the sleeve radially inwardly to reduce the size of the orifice through the sleeve. This type of valve is directly responsive to the return fluid pressure as well as to the actuating fluid pressure since the sleeve acts as a diaphragm between the return fluid and the actuating fluid.

Drilling mud, after passage through valve 30, is discharged through discharge line 31 to mud tank 14. Mud return line 28 also has connected thereto line 32 which is adapted to transmit the casing pressure of line 28 (i.e. return fluid pressure or output pressure) to second pressure transmitting means in the form of pressure transmitter 33, supplied with source air through line 33(a), which is the same type as pressure transmitter 20, supplied with source air through line 20(a), and the operation thereof is identical. Pressure transmitter 33 also has a 3–15 p.s.i. pneumatic pressure output signal which is representative of the hydraulic pressure input thereto, with the output being applied to line 34 which is connected to pneumatic biasing relay 35 and casing pressure dial 36. Relay 35 has an output which is representative of the pressure applied by line 34 (casing pressure) plus a predetermined additional pressure. A suitable biasing relay for this purpose is sold by Moore Products Company, Springhouse, Penn., and designated as their Nullmatic Biasing Relay—Model 681 as shown on their Drawing No. 10105–20. Relay 35 may sometimes be described as being part of the "limiting means" of the invention.

The predetermined additional pressure put into relay 35 is adjustable. Its maximum output pressure is equal to the signal input pressure from line 34 plus a preset pressure which is set and locked by a hand lock provided on relay 35. The input signal from line 34 is the analog of casing pressure and therefore the output of relay 35 is equal to casing pressure analog plus an analog pressure of say 500 p.s.i. (which may be the pressure in excess of casing pressure required to close drilling fluid flow through valve 30). The net result is that with this additional pressure, the maximum output from relay 35 represents, for example, 500 p.s.i. above existing casing pressure. Relay 35 can be operated from any air pressure source of 20 p.s.i. which is applied through line 37. The output of relay 35 is applied to line 38, which connects to the controller supply connection A of controller 25.

The embodiment also includes set point pressure regulator means having an adjustable pneumatic set point pressure output and one embodiment thereof is shown as adjustable pressure regulator 41 having a 20 p.s.i. air supply applied via line 42 from any convenient source. The output of regulator 41 is applied to line 43 through valve 44 and switch means 45 for selectively applying the output of regulator 41 to controller 25 through line 43(a). The switch means is shown as rotary switch 45, the latter having plural conduits therethrough. With switch 45 in the position shown in FIG. 1 and with valve 44 open, the pressure of line 43 is applied to drill pipe set point gauge 46 and set point connection C of controller 25, whereby controller 25 is placed in operation.

Output connection D of controller 25 is connected to line 48 which is connected to line 49 when switch 45 is in the position shown in FIG. 1. In addition, the output from controller 25 is also applied to line 50 which is connected to casing set point gauge 51 and to feed back connection E of controller 25.

When switch 45 is rotated to the alternate position (as shown by dotted lines), then line 43 is coupled directly with line 49, with the pressure of line 49 being controlled entirely by regulator 41. In this position, the pressure of line 43 is also applied to line 50 and the feed back connection E of controller 25, the purpose of which will be explained hereinafter. Thus, the apparatus may be taken off of automatic and placed on manual control by rotation of switch 45 to the alternate position indicated by the dotted lines thereon.

Line 49 connects through seal valve 53, to diaphragm operator 54 having a diaphragm which controls the pressure output of pressure regulator 55. Regulator 55 has an input supply on the order of 125 p.s.i. on line 56 from any convenient source and is adapted to provide an output on line 57 on the order of 0–100 p.s.i. in response to the pressure applied to the diaphragm of diaphragm operator 54. Surge tank 58 is connected to line 49 for conventional purposes.

Valve 53 is a seal type valve controlling the flow of fluid to the diaphragm of operator 54. When valve 53 is placed in the closed position, it thereby seals the existing control pressure against the diaphragm of operator 54 to thereby cause pressure regulator 55 to maintain the existing casing pressure.

Line 57 connects to pneumatically controlled hydraulic pump 60 which is adapted to apply a hydraulic pressure on the order of 0–6,000 p.s.i. oil pressure on lines 61 and 61(a) leading to valve 30.

Pump 60 and line 61 are preferably connected to a bleed back line 70 which operates to provide slow-acting relief of pressure on line 61 in the event the output pressure of pump 60 is reduced. This condition occurs for example, as gas incursions are replaced by drilling fluid. Further, lines 61 and 61(a) are preferably connected through a dump valve 52 having dump return line 62 leading back to the oil reservoir of pump 60. Dump valve 52 is adapted to automatically provide quick-acting relief of pressure in line 61(a) if that pressure should exceed the pressure level in line 61 and hence, on the return fluid. This condition occurs, for example, when slugs of debris pass valve 30.

One such dump valve is described in my copending application Ser. No. 644,531 filed June 8, 1967 and includes a valve member which is adapted to move to the dump position when the pressure generated by return fluid in valve 30 exceeds the pressure applied by pump 60 by a preset amount. In this instance, the valve closure member is biased to the closed or non-dumping position by a bypass line 61(b) which communicates with line 61 intermediate pump 60 and one-way check valve 80. The valve closure member is biased to the open (dumping) position by the application of fluid pressure to the opposite side thereof, such that when pressure generated in valve 30 exceeds the output pressure of pump 60 a specified amount, the closure member moves to the dump position.

Diaphragm operator 54 may be of the type manufactured by the Foxboro Company, Foxboro, Mass., and designated as its Model 21290. Pressure regulator 55 may be of the type manufactured by the Foxboro Company and identified in FIG. B–5369 of its Catalogue No. 565. Pump 60 may be of the type sold by Haskel Engineering and Supply Company, Burbank, California as its Model No. 16821–AD–60. Pump 60 may be considered a part of one means for operating valve 30. Pump 60 is adapted to provide a hydraulic output pressure on lines 61 and 61(a) at a level determined by the air or pneumatic pressure applied by line 57.

In certain embodiments of the invention, it is desirable to have set point pressure regulator means which will control the set point input to controller 25 in response to input flow characteristics, such as pumping rate changes. In this embodiment, line 63 is attached to an input flow sensing means, conveniently in the form of flow meter 16, at one end and to analog computer 64 at the other. Analog computer 64 is operated by an air supply of 20 p.s.i. applied on line 65 from any convenient source. Analog computer 64 also has applied thereto the output from an adjustable pressure regulator 66 which is operated by any convenient air supply via line 67. The output of pressure regulator 66 is an analog air pressure of the wells resistance to circulation, and is applied to analog computer 64 via line 68. The output of analog computer 64 is applied to line 69. Line 69 may be optionally connected to line 43 by opening valve 47 and closing valve 44 whereby the output from computer 64 constitutes the drill pipe set point pressure applied to controller 25 as a function of input flow characteristics and the well's resistance to circulation.

Flow meter 16 may be of the type sold by The Foxboro Company as its Model No. 18B. Analog computer 64 may be of the type sold by The Foxboro Company as its Pneumatic Analog Computer Model No. 556. Pressure regulator 66 is the same as pressure regulator 41 and may be of the type sold by Moore Products Company, Springhouse, Pa. and designated as its Nullmatic Pressure Regulator Series 41–15.

Referring now to FIG. 2, controller 25 is shown therein having a control panel 71 having connections lettered A, B, C, D, and E which correspond respectively with the connections shown on controller 25 in FIG. 1. Connections B connects to line 72 through reversing plate 73 and applies the measurement air signal (drill pipe pressure) to measurement bellows 74. Connection A is connected to line 76 which provides the controller supply pressure through relay 77, the output of which is controlled by reducing tube 78, and the escape of air pressure from nozzle 79, mounted on a portion of band dial 80 which is mounted for rotation on support shaft 81 for adjusting purposes. The output of relay 77 is applied to line 82 which connects to connection D. Connection C connects with line 84 through reversing plate 73 and is applied to set bellows 85. Connection E, which is the feed back connection, is connected to line 87 which is connected to proportioning bellows 88. Line 87 also connects with line 89 which leads to adjustable restrictor 90, to reset capacity tank 91, to line 92, which connects with reset bellows 93. Each of the bellows 74, 85, 88, and 93 is adapted to provide an upward pressure force against force balancing "floating disc" 94, which pressure force is proportional to the air presure applied thereto. Any change in pressure force exerted by any of the bellows will cause disc 94 to pivot on fulcrums 95 of proportional band adjusting lever 96, thereby varying the flow of air out nozzle 79 and controlling the output of relay 77.

During the proportional action of controller 25, a change in pressure in the measurement bellow 74 or set bellows 85 moves that side of disc 94 up or down and causes a change in nozzle pressure at nozzle 79, which results in an increased or decreased output pressure from relay 77. This variance in output pressure acts to reposition the valve 30, thus bringing about a change ultimately in drill pipe pressure and hence, measurement bellows 74. The output on line 82 from relay 77 is also fed back through proportioning bellows 88. This continues until a balance of forces is restored against disc 94. Thus, changes in output pressure from controller 25 are proportional to changes in measurement pressure or set point pressure. In the embodiment shown, as the measurement signal (drill pipe pressure) applied to bellows 74 increases, the output on line 82 decreases, and vice versa.

Changes in the output on line 82 are fed back to reset bellows 93 as well as proportioning bellows 88, but at a reduced rate, depending upon the setting of adjustable restrictor 90. This resetting action continues until the pressure in proportioning bellows 88 and reset bellows 85 are equal. However, this action occurs at an ever decreasing rate as a final balance point is reached, at which time the measurement pressure and set point pressures are equal. Thus, reset action is dependent on the deviation of the measurement from the control set point and the setting of reset restrictor 90.

During normal drilling operations, the valves upstream from valve 30 will be closed with the return mud being delivered to the normal mud handling equipment such as shale shaker, degasser, etc. However, upon indication of a blow-out condition, i.e. incursion of fluids into the well bore from the formation, the well is shut in by closing of blow-out preventor 11 in the usual manner. Thereafter, the operator will normally take a drill pipe pressure reading and calculate the increased weight of mud required to keep the well under control. Then the return drilling fluid is directed through valve 30 which is opened sufficiently for the drilling mud to pass therethrough and maintain the desired back pressure, which back pressure plus existing hydrostatic pressure will keep the well under control. At the same time, pump 12 is started up and the new mud with the heavier weight is circulated to the bottom of the drill pipe. At this point, pump 12 is again shut down and the drill pipe pressure reading taken to determine whether or not the right amount of weight has been added to the mud, which would be indicated by a zero reading of drill pipe pressure.

Under normal circumstances, as new mud is pumped in, casing pressure will probably increase because of expansion of the gas as it rises in the annulus causing gas cutting of the mud. Then, the casing pressure will decline.

Under the usual procedure of killing a gas kick, new mud of heavier weight is pumped the well to thereby increase the hydrostatic pressure of the mud, thereby reducing or eliminating the back pressure that must be maintained on the mud to keep the well under control. As new mud is circulated up the annulus, the gas incursion nears the surface and expands because it is under less hydrostatic pressure. As it expands, it displaces mud in the annulus thus reducing the hydrostatic pressure on bottom. As the gas expands, applied surface back pressure must be increased in order to offset this reduction in hydrostatic pressure. As the gas reaches the surface and is discharged while mud is being pumped up below it, the hydrostatic pressure is increasing rapidly. As the gas is discharged, the applied surface back pressure must be reduced rapidly in order to offset the increase in hydrostatic pressure.

Use of this invention will maintain a constant pressure at the bottom of the well, i.e. just enough pressure to balance formation pressure during circulation.

In the operation of applicant's invention, sufficient pressure is automatically supplied to valve 30 to maintain substantially constant bottom hole pressure until static drill pipe pressure has been reduced to essentially zero by circulating new mud. The apparatus of the present invention is then placed in the operating condition shown in FIG. 1, with the output of adjustable pressure regulator 41 set to provide a set point pressure to controller 25 which is equal to the observed circulating drill pipe pressure and thus cause controller 25 is provide an output therefrom which will apply hydraulic pressure to valve 30 sufficient to maintain the drill pipe pressure equal to the drill pipe pressure set point. Controller 25 will be set by adjustment of restrictor 90 such that the response time thereof is compatible with existing pressure lag time in the well. That is, the time required for a casing back pressure change to travel down the annulus and back up the drill pipe and be reflected as a change in drill pipe pressure. The adjustable response time is necessary to prevent overshoot, undershoot and hunting.

One desirable feature of the illustrated embodiment is the operation of pneumatic biasing relay 35, which is the supply source for controller 25. The purpose of biasing relay 35 is to prevent the controller 25 from "winding up" and resulting in "winding up" of valve 30, when the circulation of drilling fluid is stopped and drill pipe pressure does down, probably to as low as zero. The term "winding up" is used to mean the complete shutting in of the valve 30.

Under static (non-circulating) condition, the measured variable, i.e. drill pipe pressure, falls below the set point provided by pressure regulator 41. The increased output from controller 25, as a result thereof, causes increased constriction to valve 30. However, with no flow through valve 30, further constriction of valve 30 by the application of fluid pressure thereto cannot increase the measured variable, i.e. drill pipe pressure, back up to equal the set point value established by pressure regulator 41. Therefore, the output of controller 25 would continue to rise up to its maximum output pressure. This situation wold normally have undesirable effects when circulation was resumed, particularly in view of the required response rate of controller 25. Without the benefit of the operation of biasing relief relay 35 casing pressure valve 30 would be closed to its maximum pressure condition thereby creating a large overshoot or over pressure required by pump 12 on the drilling fluid and hence, on drill pipe pressure and bottom-hole pressure, before equilibrium conditions would be reached.

However, by use of biasing relay 35, the maximum input supply pressure to controller 25 and hence, the maximum output pressure from controller 25 is limited to safe and desirable values, automatically, when circulation is stopped. As explained above, relay 35 has a maximum output pressure equal to the signal input pressure from line 34 plus a preset pressure which is set and locked by hand knob on relay 35. The input signal on line 34 is the analog of casing pressure, and therefore, the output of relay 35 is equal to the casing pressure analog plus a preselected analog pressure of say 500 p.s.i., for example, or whatever pressure above casing pressure is required to close valve 30. The net result of this is that the maximum output of controller 25 under shut-in conditions is equal to an analog pressure of 500 p.s.i. above existing casing pressure. When controller 25 closes valve 30 to a pressure value of 500 p.s.i. in excess of existing casing pressure, controller 25 output pressure stops rising because it has reached its maximum output pressure under these conditions. This insures complete shut-in of the casing (and valve 30) when circulation stops, but does not create a situation which will cause significant overshoot when circulation is resumed. Thus, this mode is automatic for stopping and starting circulation, as no adjustments need be made.

Another desirable feature of the illustrated embodiment is the operation of seal valve 53 and switching valve 45. When seal valve 53, (which may be of the spring return type) is closed, it seals the existing control pressure in diaphragm operator 54 and capacity tank 58 so that pressure regulator 55 will cause pump 60 to maintain the existing pressure in the casing while the mode of operation of the apparatus is transferred from automatic dirll pipe pressure control to manual (semi-automatic) casing pressure control or during the reverse operation.

Switching valve 45 is shown in the automatic drill pipe pressure mode by the solid lines thereon. Rotation to the dotted lines thereon puts the system into manual casing pressure regulation. Pressure regulator 41, which is used for drill pipe set point (to controller 25) in the automatic drill pipe pressure mode is now used to manually set the casing pressure set point. Readjustment of regulator 41 to existing casing pressure is accomplished by observing casing pressure set point gauge 51. Adjustment is made with valve 53 closed so no upset to well pressure occurs. When the adjustment is made, the valve 53 is then opened without upset to well pressure.

In this manual casing pressure control mode, controller 25 is disabled by communicating and equalizing the set point (normally supplied by adjustable regulator 41) with the measured variable (casing pressure). Special consideration is given to controller 25 feed back so that transfer from manual back to automatic can be achieved without upset. During manual operation, the control pressure going to diaphragm operator 54 is also fed back through line 50 to feed back connection E of controller 25. In going back to automatic mode, seal valve 53 is closed, switch valve 45 is rotated to automatic position and pressure regulator 41 is adjusted to move the drill pipe set point to the existing drill pipe pressure. If after the transfer the output of controller 25 is not exactly equal to the proper pressure (this is, the pressure which was sealed into diaphragm operator 54) it can be corrected (before opening valve 53) by adjusting the set point valve above or below the actual drill pipe pressure momentarily. This causes controller 25 output to increase or decrease toward the required pressure gradually. When this pressure output is correct, valve 53 is opened and the set point pressure is adjusted back to correspond to the measured drill pipe pressure so that the controller will then maintain the output pressure and the transition is made without upset to the well pressure. If the feed back to controller 25 via connection E were allowed to bleed down or otherwise vary from the existing pressure in diaphragm operator 54, then a considerable well pressure upset would occur when valve 53 was opened because of the pre-set response rate of controller 25 output change.

In the method of well killing by maintaining a constant drill pipe pressure, it is assumed that a constant circulation rate will be maintained by pump 12. If the circulation rate should be reduced (as by partial pump failure) then less pressure is required to circulate this smaller rate of mud flow down the drill pipe and up the annulus. If the drill pipe pressure is automatically (or manually) held constant when circulation is reduced, excessive pressure is applied to the bottom of the hole.

Therefore, the automatic drill pipe set point control of the illustrated embodiment will now be explained. With the output of flow meter 16 being proportional to the velocity (or flow rate) squared, as is typical of restrictive type flow meters, its output pressure is proportional to the drill pipe pressure which results from this flow. Therefore its output can be made an analog function of drill pipe pressure either by its range calibration or more readily by putting its output into pneumatic analog computer 64. Also supplied to this computer is an adjustable pressure from regulator 66. The function of computer 64 is to multiply the input signal pressures from flow meter 16 and adjustable pressure regulator 66 and produce an adjustable output pressure which is proportional to their product. This adjustable pressure is then set to a value such that, for the existing parameters, such as drill pipe size, depth, bit nozzle size etc., the output of computer 64 is an analog of circulating drill pipe pressure. This adjustment is made empirically during normal drilling operations to give the output of computer 64 a true analog relation to actual measured drill pipe pressure independently of circulation rate (at least within the normal range of circulation rates). With computer 64 properly adjusted to give a true drill pipe pressure analog, its output can be switched in to line 43 through valve 47, with valve 44 closed, so that computer 64 supplies the drill pipe set point for controller 25. In this mode of operation, changes in circulation rate will be accompanied by a corresponding change in drill pipe set point and controller 25 will not change its output as a result of the change in drill pipe pressure caused by a change in circulation rate. In this way, the bottom hole applied pressure is maintained at the correct value even though circulation rate is changed.

Further modifications may be made in the invention as particularly described without departing from the scope thereof. Accordingly, the foregoing description is to be construed as illustrative only and is not to be construed as a limitation upon the invention as defined in the following claims.

What is claimed is:

1. In apparatus for controlling bottom-hole pressure in a well bore having a drill string and drilling fluid therein, the combination comprising:
   means operably connected to said well bore for injecting drilling fluid;
   first means operably connected to said injecting means for sensing drilling fluid input pressure variations and transmitting a responsive signal;
   second means operably connected to said well bore for sensing a drilling fluid input flow characteristic and transmitting a responsive signal; and
   means operably connected to said first and second means and simultaneously responsive to said signals for regulating fluid return from said well bore.

2. In apparatus for controlling bottom-hole pressure in a well bore having a drill string and drilling fluid therein, the combination comprising:
   means operably connected to said well bore for injecting drilling fluid;
   first fluid conduit means connected to said well for receiving therethrough drilling fluid returning from said well;
   fluid pressure actuated return drilling fluid pressure regulator means connected in said first conduit means for controlling return fluid pressure substantially independently of variations in flow rate of the returning fluid;
   pump means operably associated with said regulator means for supplying another pressurized fluid to said regulator means;
   first transmitter means connected to said injecting means and responsive to the pressure of said drilling fluid just prior to circulation of said fluid down through said well and having an output which is representative of the pressure of said drilling fluid prior to said circulation;
   second transmitter means connected to said first conduit means and responsive to the pressure of said returning fluid upstream from said regulator means and having an output which is representative of the pressure of said returning fluid;
   set point means having an adjustable set point output;
   controller means operably connected to said first and second transmitter means and simultaneously responsive to the outputs of said first and second transmitter means and said set point means, for providing an output the change of which is proportional to the difference between the outputs from said first transmitter means and said set point means; and
   means operably connected to said controller means for applying the output of said controller means to said pump means to thereby control the pressure of said fluid delivered to said regulator means, and thereby maintain a back pressure on said returning drilling fluid.

3. The invention as claimed in claim 2 wherein:
   said controller means includes feed back means for applying the output therefrom to control the response period of said controller means.

4. The invention as claimed in claim 2 including:
   relay means connected to said second transmitter means and adapted to receive the output of said second transmitter means, and having an output which is representative of the pressure of said returning drilling fluid plus a predetermined additional pressure for limiting the output of said controller means in response to output fluid pressure.

5. The inventon as claimed in claim 2 wherein:
   said pump means includes a pneumatically controlled hydraulic pump having the output connected to said pressure regulator means and including a diaphragm operated pressure regulator connected to be responsive to the output of said controller means and to apply a pneumatic control pressure to said pump; and
   means operably connected to said controller means for controlling the application of the output from said controller means to said diaphragm operated pressure regulator, said means in one position acting to seal existing control pressure against the diaphragm operated pressure regulator to thereby cause said diaphragm operated pressure regulator to cause said pump means to operate at a level to cause said regulator means to maintain existing casing pressure.

6. The invention as claimed in claim 5 including:
   switch means operably connected to said controller means for selectively applying the output of said set point means to said controller means and said diaphragm operated pressure regulator means whereby said apparatus may be selectively operated automatically and manually respectively.

7. In apparatus for controlling bottom-hole pressure in a well bore having a drill string and drilling fluid therein, the combination comprising:
   means operably connected with said well bore for injecting drilling fluid;
   first means operably connected with said injecting means for sensing drilling fluid input pressure and transmitting a signal which varies in response to variations in said input pressure;
   second means operably connected with said well bore for regulating fluid return from said well bore to impose back pressure on said fluid return; and
   means operably connected with said first and second means and simultaneously responsive to both said signal and to fluid return pressure variations for controlling said regulating means.

8. In apparatus for controlling back pressure on a well bore having a drill string and drilling fluid therein, the combination comprising:
   means operably connected with said well bore for injecting drilling fluid;
   first means operably connected with said injecting means for sensing drilling fluid input pressure and transmitting a signal representative thereof;
   second means operably connected with said well bore for regulating return fluid from said well bore to impose back pressure on said return fluid; and
   means operably connected with said first and second means for operating said return fluid regulating means and being simultaneously responsive to said signal and to return fluid pressure variations.

9. In apparatus for controlling back pressure on a well bore having a drill string and drilling fluid therein, the combination comprising:
   means operably connected with said well bore for injecting drilling fluid into said well;
   first means operably connected with said injecting means for sensing drilling fluid input pressure and transmitting a signal representative thereof;
   second means operably associated with said first means for receiving said transmitted signal and another set point signal, said second means being adapted for generating a third output signal which changes in relation to the difference between said transmitted signal and said set point signal; and
   flow control means operably connected with said second means and simultaneously responsive to said third output signal and to the pressure of output fluid from said well, said flow control means being arranged for varying the flow of output fluid from said well so as to maintain output fluid pressure in direct relation to said third output signal.

10. The method of controlling bottom-hole pressure in a well bore having a drill string and drilling fluid therein, comprising the steps of:
    injecting drilling fluid into said well bore;
    sensing drilling fluid input pressure and transmitting a signal responsive to variations in said pressure;
    sensing a drilling fluid input flow characteristic and transmitting a signal responsive to variations in said characteristic; and,
    regulating fluid return pressure from said well bore in simultaneous response to said signals.

11. The invention as claimed in claim 10 including the step of:
    limiting said signal representing variations in said drilling fluid input pressure in response to output fluid pressure.

12. The method of controlling back pressure on a well bore having a drill string and drilling fluid therein comprising the steps of:
    pumping drilling fluid into said well bore under pressure;
    sensing the drilling fluid input pressure;
    simultaneously sensing the return fluid pressure;
    imposing back pressure on said well bore by controlling the flow of fluid from said well bore; and
    automatically varying said back pressure in response to changes in said input pressure and said return fluid pressure.

13. The invention as claimed in claim 12 including the steps of:
    simultaneously sensing a drilling fluid input flow characteristic and transmitting a signal responsive to variations in said characteristic; and,
    automatically regulating fluid return pressure from said well bore in response to changes in said flow characteristic.

References Cited

UNITED STATES PATENTS

| | | | |
|---|---|---|---|
| 3,318,319 | 8/1967 | Griffin | 175—25 |
| Re. 26,220 | 6/1967 | Records | 175—25 X |
| 1,310,615 | 7/1919 | Greenlee | 166—8 X |
| 2,884,132 | 4/1959 | Kangas | 166—8 X |
| 3,219,107 | 11/1965 | Brown, et al. | 166—8 |
| 3,260,308 | 7/1966 | Cryer | 166—8 |
| 3,362,487 | 1/1968 | Lindsey | 175—38 |

NILE C. BYERS, JR., Primary Examiner

U.S. Cl. X.R.

138—45

PO-1050
(5/69)

UNITED STATES PATENT OFFICE
CERTIFICATE OF CORRECTION

Patent No. 3,470,971      Dated October 7, 1969

Inventor(s)   Ethell J. Dower

It is certified that error appears in the above-identified patent and that said Letters Patent are hereby corrected as shown below:

Column 5, lines 58-59, change "connections" to --connection--. Column 6, line 60, after the word "pumped" insert --into--. Column 7, line 13, change the word "is" to the word --to--; line 22, change the word "The" to --This--; line 30, change the word "does" to --goes--; line 44, correct the spelling of the word "wold" to --would--. Column 8, line 12, correct the spelling of the word "dirll" to --drill--. Column 10, lines 21-22, correct the spelling of the word "reponse" to --response--.

SIGNED AND
SEALED
MAY 19 1970

(SEAL)
Attest:

Edward M. Fletcher, Jr.
Attesting Officer

WILLIAM E. SCHUYLER, JR.
Commissioner of Patents